US007013665B2

(12) United States Patent
Matsuoka

(10) Patent No.: US 7,013,665 B2
(45) Date of Patent: Mar. 21, 2006

(54) ELECTRIC INSULATING DEVICE OF AIR CONDITIONER, AND AIR CONDITIONER WITH THE DEVICE

(75) Inventor: Hiromune Matsuoka, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 28 days.

(21) Appl. No.: 10/506,635

(22) PCT Filed: Mar. 10, 2003

(86) PCT No.: PCT/JP03/02816

§ 371 (c)(1), (2), (4) Date: Sep. 3, 2004

(87) PCT Pub. No.: WO03/078902

PCT Pub. Date: Sep. 25, 2003

(65) Prior Publication Data

US 2005/0166624 A1 Aug. 4, 2005

(30) Foreign Application Priority Data

Mar. 18, 2002 (JP) ............................. 2002-074381

(51) Int. Cl.
*F25D 19/00* (2006.01)
*H01B 17/34* (2006.01)

(52) U.S. Cl. ........................................... 62/298; 174/30

(58) Field of Classification Search .................. 62/298; 174/24, 30, 47; 138/103
See application file for complete search history.

(56) References Cited

U.S. PATENT DOCUMENTS 4,029,889 A * 6/1977 Mizuochi .................. 174/11 R
5,927,093 A * 7/1999 Noguchi et al. ........... 62/259.1

FOREIGN PATENT DOCUMENTS

JP 51-128024 U 10/1976
JP 4-136 A 1/1992
JP 7-65783 A 3/1995
JP 10-54498 A 2/1998
JP 2000-329273 A 11/2000

* cited by examiner

*Primary Examiner*—Melvin Jones
(74) *Attorney, Agent, or Firm*—Shinjyu Global IP Counselors

(57) ABSTRACT

The present invention provides an electric insulation device of an air conditioner divided into an indoor unit and an outdoor unit which can improve work efficiency during installation of the indoor unit and the outdoor unit. An electric insulation device is arranged between a gas side connection line and a gas side refrigerant line of an outdoor unit, and electrically insulates the gas side connection line and the gas side refrigerant line on the outdoor unit side. The electric insulation device includes a refrigerant line connection portion that is connected to a gas side refrigerant line of the indoor unit, a connection line connection portion that is connected to the gas side connection line, an insulation portion capable of both electrically insulating the refrigerant line connection portion and the gas side connection line and circulating refrigerant, and a terminal portion on which an electric connection line is mounted.

4 Claims, 2 Drawing Sheets

ELECTRIC INSULATING DEVICE OF AIR CONDITIONER, AND AIR CONDITIONER WITH THE DEVICE

TECHNICAL FIELD

The present invention relates to an electric insulation device of an air conditioner and an air conditioner having the same, and more particularly relates to an electric insulation device of an air conditioner that is divided into an indoor unit and an outdoor unit, and an air conditioner having the same, the electric insulation device serving to electrically insulate between the refrigerant lines of the indoor unit or the refrigerant lines of the outdoor unit and connection lines that serve to connect the refrigerant lines of the indoor unit and the refrigerant lines of the outdoor unit and circulate refrigerant.

BACKGROUND ART

In an air conditioner which is divided into an indoor unit and an outdoor unit, the connection between the indoor unit and the outdoor unit is generally performed by means of a gas side connection line and a liquid side connection line which serve to connect the indoor unit refrigerant lines and the outdoor unit refrigerant lines, and by means of electric connection lines that serve to transmit electric signals between the indoor unit and the outdoor unit.

With this type of air conditioner, time and effort will be needed in order to perform the installation thereof, because one will need to connect each connection line to the indoor unit refrigerant lines and the outdoor unit refrigerant lines, and connect the electric connection lines. Because of this, it is desirable to improve the work efficiency of the installation. In particular, with a system for a building or the like which has a plurality of air conditioners, it is desirable to improve the work efficiency of installing the air conditioners, from the perspective of shortening the time needed for installation.

A configuration in which the gas side connection lines and the liquid side connection lines are used as the electric connection lines is disclosed in Japanese Unexamined Patent Publication H07-65783 as a means of solving the aforementioned problem. Specifically, by providing an electric insulation device in the connection portions between the gas side connection line and the liquid side connection line and the indoor unit refrigerant line and the outdoor unit refrigerant line, the gas side connection line and the liquid side connection line between the refrigerant lines of the indoor unit and the refrigerant lines of the outdoor unit are electrically insulated and used as electric connection lines.

However, because the conventional electric insulation device described above is either installed in the indoor unit and the outdoor unit, or is mounted on the indoor unit and the outdoor unit, it will be difficult to deal with problems such as refrigerant leakage, short-circuits, or the like in the electric insulation device when the indoor device and the outdoor device are being installed, the locations where the indoor unit and the outdoor unit can be installed are limited, and the like, and thus improvement in work efficiency during installation may not be satisfactorily realized.

SUMMARY OF THE INVENTION

An object of the present invention is to provide an electric insulation device of an air conditioner divided into an indoor unit and an outdoor unit which can improve work efficiency during installation of the indoor unit and the outdoor unit.

According to a first aspect of the present invention, the electric insulation device of an air conditioner divided into an indoor unit and an outdoor unit serves to electrically insulate connection lines that serve to connect refrigerant lines of the indoor unit and refrigerant lines of the outdoor unit and circulate refrigerant, from the refrigerant lines of the indoor unit or the refrigerant lines of the outdoor unit, and includes a refrigerant line connection portion, a connection line connection portion, and an insulation portion.

Refrigerant line connection portions are installed on the exterior of the indoor unit and the outdoor unit, and are respectively connected to the refrigerant line of the indoor unit and the refrigerant line of the outdoor unit. Connection line connection portions are connected to the connection lines. The insulation portions can both electrically insulate the refrigerant line connection portions and the connection line connection portions, and circulate refrigerant.

With the electrical insulation device of an air conditioner, the connection between the refrigerant lines and the refrigerant line connection portions of the indoor unit and the outdoor unit is performed on the exterior of the indoor unit and the outdoor unit. In other words, the electric insulation device is an integral unit that is formed from the refrigerant line connection portion, the connection line connection portion, and the insulation portion, and is disposed on the exterior of the indoor unit and the outdoor unit. Because of this, during installation of the indoor unit and the outdoor unit, even if problems occur in the electric insulation unit such as refrigerant leakage and short-circuits, the work efficiency of the installation of the indoor unit and the outdoor unit will improve because the electric insulation device can be easily replaced, and the locations where the indoor unit and the outdoor unit can be installed are not limited.

According to a second aspect of the present invention, the electric insulation device of an air conditioner of the first aspect of the present invention is provided, in which a terminal portion on which an electric connection line is mounted in order to transmit electric signals from the indoor unit and the outdoor unit to the connection lines is arranged between the connection line connection portion and the insulation portion.

With the electric insulation device of an air conditioner, the indoor unit and the outdoor unit will be easily wired with the electric insulation device, because the electric insulation device is an integral unit that further includes the terminal portion on which the electric connection line is mounted.

According to a third aspect of the present invention, an air conditioner includes an indoor unit, an outdoor unit, connection lines, and electric insulation devices of the first or second aspect of the present invention. The connection lines connect the refrigerant lines of the indoor unit and the refrigerant lines of the outdoor unit, and circulate refrigerant. The electric insulation devices are respectively arranged between the refrigerant lines and the connection lines of the indoor unit, and between the refrigerant lines and the connection lines of the outdoor unit.

With this air conditioner, the work efficiency of the installation of the indoor unit and the outdoor unit can be improved, because separate units of the electric insulation devices are employed on the indoor unit and the outdoor unit, and because electric insulation is performed between the refrigerant lines and the connection lines of the indoor device, and between the refrigerant lines and the connection lines of the outdoor device.

PREFERRED EMBODIMENTS OF THE INVENTION

[First Embodiment]

A first embodiment of the present invention will be described below with reference to the figures.

Figure 1:
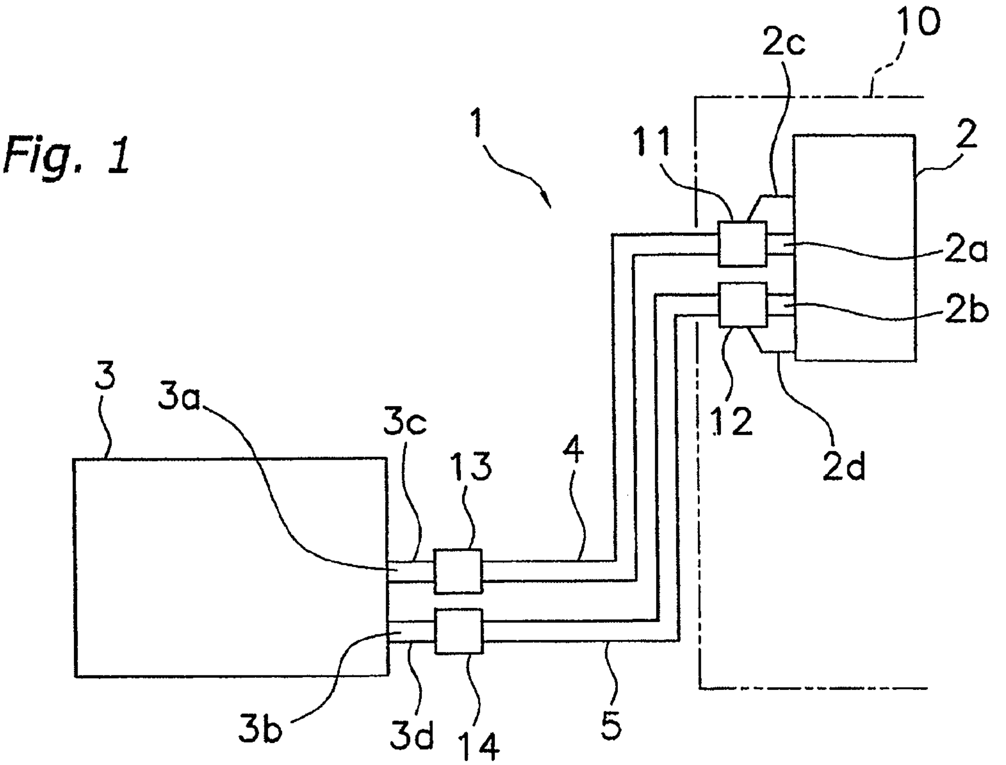
FIG. 1 is a structural view of an air conditioner according to an embodiment of the present invention.

(1) Configuration of air conditioner and structure of electric insulation device FIG. 1 shows the configuration of an air conditioner 1 according to this embodiment. As shown in FIG. 1, the air conditioner 1 includes an indoor unit 2 that is installed on the inner side of an outer wall 10 of a building, an outdoor unit 3 that is installed on the outer side of the outer wall 10, a gas side connection line 4 (connection line), a liquid side connection line 5 (connection line), electric insulation devices 11, 12 which are respectively provided between the gas side connection line 4 and a gas side refrigerant line 2*a* on the indoor unit 2 side and between the liquid side connection line 5 and a liquid side refrigerant line 2*b* on the indoor unit 2 side, electric insulation devices 13, 14 which are respectively provided between the gas side connection line 4 and a gas side refrigerant line 3*a* on the outdoor unit 3 side and between the liquid side connection line 5 and a liquid side refrigerant line 3*b* on the outdoor unit 3 side, electric connection lines 2*c*, 2*d* that are respectively connected from the indoor unit 2 to the electric insulation devices 11, 12, and electric connection lines 3*c*, 3*d* that are respectively connected from the outdoor unit 3 to the electric insulation devices 13, 14.

The gas side connection line 4 and the liquid side connection line 5 are, for example, made from a metal such as copper or the like, and serve to connect the refrigerant lines of the indoor unit 2 and the refrigerant lines of the outdoor unit 3 and allow refrigerant to circulate. The refrigerant lines 2*a*, 2*b* on the indoor unit 2 side and the refrigerant lines 3*a*, 3*b* on the outdoor unit 3 side are, for example, made of a metal such as copper or the like, and are connected to equipment installed inside the indoor unit 2 and the outdoor unit 3.

The electric insulation device 11 is arranged between the gas side connection line 4 and the gas side refrigerant line 2*a* of the indoor unit 2, and electrically insulates the gas side connection line 4 and the gas side refrigerant line 2*a* on the indoor unit 2 side. The electric insulation device 12 is arranged between the liquid side connection line 5 and the liquid side refrigerant line 2*b* of the indoor unit 2, and electrically insulates the liquid side connection line 5 and the liquid side refrigerant line 2*b* on the indoor unit 2 side. The electric insulation device 13 is arranged between the gas side connection line 4 and the gas side refrigerant line 3*a* of the outdoor unit 3, and electrically insulates the gas side connection line 4 and the gas side refrigerant line 3*a* on the outdoor unit 3 side. The electric insulation device 14 is arranged between the liquid side connection line 5 and the liquid side refrigerant line 3*b* of the outdoor unit 3, and electrically insulates the liquid side connection line 5 and the liquid side refrigerant line 3*b* on the outdoor unit 3 side. In other words, the gas side connection line 4 and the liquid side connection line 5 between the indoor unit 2 and the outdoor unit 3 are electrically insulated from the refrigerant lines 2*a*, 2*b*, 3*a*, 3*b* on the indoor unit 2 and the outdoor unit 3 sides by means of the electric insulation devices 11–14.

The electric insulation lines 2*c*, 2*d*, 3*c*, 3*d* are conductors which serve to transmit electric signals such as control signals and the like between the indoor unit 2 and the outdoor unit 3, and are respectively electrically connected to the gas side connection line 4 and the liquid side connection line 5 via the electric insulation devices 11, 12, 13, 14. In other words, the gas side connection line 4 functions as an electric line in order to connect the electric connection lines 2*c* and 3*c*, and the liquid side connection line 5 functions as an electric line in order to connect the electric connection lines 2*d* and 3*d*.

Next, the structure of the electric insulation device 11 will be described. Note that although the connection positions of the other electric insulation devices 12, 13, 14 with each line are different, a description of the other electric insulation devices 12, 13, 14 will be omitted because they have the same structure as that of the electric insulation device 11.

Figure 2:
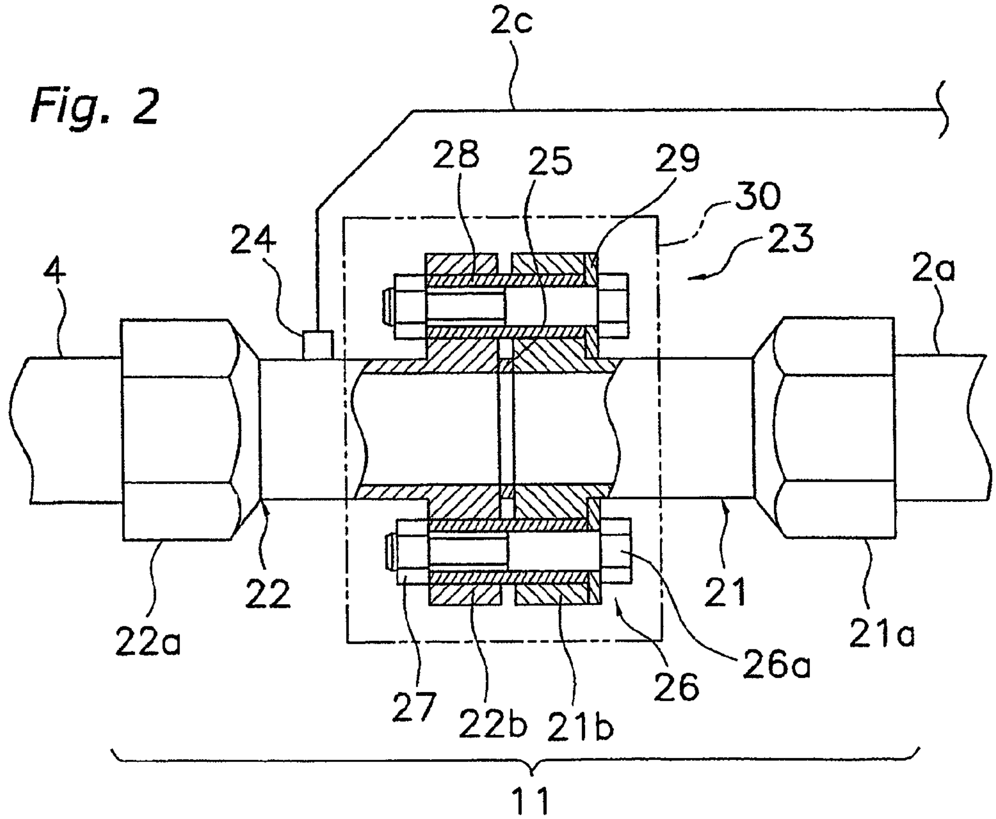
FIG. 2 shows an electric insulation device of a first embodiment.

As shown in FIG. 2, the electric insulation device 11, includes a refrigerant line connection portion 21 that is connected to the gas side refrigerant line 2*a* of the indoor unit 2, a connection line connection portion 22 that is connected to the gas side connection line 4, an insulation portion 23 capable of both electrically insulating the refrigerant line connection portion 21 and the gas side connection line 4 and circulating refrigerant, and a terminal portion 24 on which the electric connection line 2*c* is mounted.

The refrigerant line connection portion 21 is, for example, made of a metal such as copper or the like, and is connected to the gas side refrigerant line 2*a* of the indoor unit 2 by means of a flare nut 21*a* that is arranged on the refrigerant line 2*a* side of the indoor unit 2 side. The connection line connection portion 22 is connected to the gas side connection line 4 by means of a flare nut 22*a* that is arranged on the gas side connection line 4 side. Thus, the refrigerant line connection portion 21 forms an end portion of the gas side connection line 4 side of the gas side refrigerant line 2*a*, and the connection line connection portion 22 forms an end portion of the gas side refrigerant line 2*a* side of the gas side connection line 4.

The insulation portion 23 is formed from an annular first flange 21*b* that is formed on the end portion of the gas side connection line 4 side of the refrigerant line connection portion 21, an annular second flange 22*b* that is formed on the end portion of the indoor unit 2 side of the connection line connection portion 22, a gasket 25 that is arranged between the first flange 21*b* and the second flange 22*b*, a plurality of through bolts 26 and nuts 27 that serve to join the first flange 21*b* and the second flange 22*b*, a sleeve 28 that lies between the through bolts 26 and the bolt holes of the first flange 21*b* and the second flange 22*b*, and a washer 29 that is interposed between head portions 26*a* of the through bolts 26 and the first flange 21*b*. In addition, the head portions 26*a* of the through bolts 26 are covered by a coating material composed of an electric insulation material such as ceramic, resin, or the like. Here, the first flange 21*b*, the second flange 22*b*, and the plurality of through bolts 26 and the nuts 27 are made of a metal. The gasket 25 is an annular member that is composed of an electric insulation material such as rubber, resin, or the like. The sleeve 28 is a cylindrical member that is composed of an electric insulation material such as a resin. Furthermore, the insulation portion 23 is covered by a thermal insulation material.

The insulation portion 23 described above allows the refrigerant line connection portion 21 and the connection line connection portion 22 to be electrically insulated, and allows refrigerant to circulate. Thus, the gas side refrigerant line 2*a* of the indoor unit 2 and the gas side connection line 4 are electrically insulated via the insulation portion 23. Then, electric signals can be transmitted via the gas side connection line 4 between the electric connection line 2*c* of the indoor unit 2 and the electric connection line 3*c* of the outdoor unit 3. In addition, electric signals can be transmitted via the liquid side connection line 5 between the electric connection line 2*d* of the indoor unit 2 and the electric connection line 3*d* of the outdoor unit 3.

(2) Special characteristics of the electric insulation device

The special characteristics of the electric insulation device of the present embodiment are as follows:

① Unitization of the electric insulation device

With the electric insulation devices 11–14 of the air conditioner of this embodiment, the connections between the refrigerant lines and the refrigerant line connection portions of the indoor unit 2 and the indoor unit 3 are performed on the exterior of the indoor unit 2 and the outdoor unit 3. In other words, each of the electric insulation devices 11–14 is an integral unit that is formed from the refrigerant line connection portion 21, the connection line connection portion 22, and the insulation portion 23, and are disposed on the exterior of the indoor unit 2 and the outdoor unit 3. Because of this, during installation of the indoor unit 2 and the outdoor unit 3, even if problems occur in the electric insulation units 11–14 such as refrigerant leakage and short-circuits, the work efficiency of the installation of the indoor unit 2 and the outdoor unit 3 will improve because the electric insulation devices can be easily replaced, and the locations where the indoor unit 2 and the outdoor unit 3 can be installed are not limited. In addition, with the electric insulation device 11–14 of the air conditioner of the present embodiment, the indoor unit 2 and the outdoor unit 3 can be easily wired with the electric insulation devices 11–14, because each of the electric insulation devices 11–14 further include the terminal portion 24 on which the electric connection lines 2*c*, 2*d*, 3*c*, 3*d*.

② Improvement in reliability of the electric insulation device

With the electric insulation devices 11–14 of the air conditioner of this embodiment, both the work efficiency during installation can be improved, and the reliability with respect to refrigerant leakage, short-circuits, and the like can be improved, because the joining of the first flange 21*b* and the second flange 22*b* of the insulation portion 24 can be performed at the factory or the like, and it will not be necessary to perform this task at the installation site.

③ Application to previously installed air conditioners

With the electric insulation devices 11–14 of the air conditioner of this embodiment, the electric insulation devices 11–14 can be applied to previously installed air conditioners because, as noted above, they are units that are separate from the indoor unit 2 and the outdoor unit 3.

[Second Embodiment]

Figure 3:
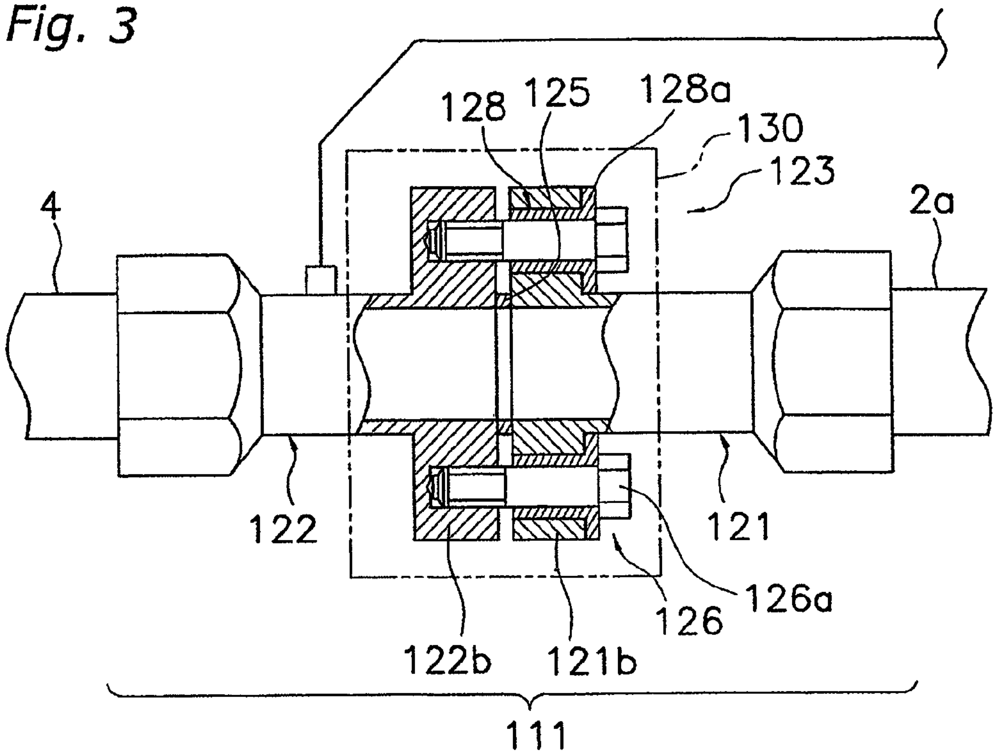
FIG. 3 shows an electric insulation device of a second embodiment.

The present embodiment has the same basic structure as that of the first embodiment, and only the structure of the insulation portion of the electric insulation device is different. An insulation portion 123 of the present embodiment will be described below with reference to FIG. 3. Note that here, an electric insulation device 111 that corresponds to the electric insulation device 11 of the first embodiment will be described, and a description of other electric insulation devices 112, 113, 114 will be omitted.

The insulation portion 123 of the electric insulation device 111 includes is formed from an annular first flange 121*b* that is formed on the end portion of the gas side connection line 4 side of a refrigerant line connection portion 121, an annular second flange 122*b* that is formed on the end portion of the indoor unit 2 side of the connection line connection portion 122, a gasket 125 that is arranged between the first flange 121*b* and the second flange 122*b*, a plurality of push bolts 126 that serve to join the first flange 121*b* and the second flange 122*b*, and a sleeve 128 that lies between the bolt holes of the first flange 121*b* and the push bolts 126. The sleeve 128 includes a washer portion 128*a* that is interposed between head portions 126*a* of the push bolts 126 and the first flange 121*b*. In addition, the head portions 126*a* of the push bolts 126 are covered by a coating material composed of an electric insulation material such as ceramic, resin, or the like. Here, the first flange 121*b*, the second flange 122*b*, and the plurality of push bolts 126 are made of a metal. The gasket 125 is an annular member that is composed of an electric insulation material such as rubber, resin, or the like. The sleeve 128 is a cylindrical member that is composed of an electric insulation material such as resin. Then, the insulation portion 123 is covered by a thermal insulation material 130.

In the present embodiment, the same effects as those of the first embodiment can be obtained.

[Other Embodiments]

Although embodiments of the present invention were described above based upon the figures, the specific configuration of the present invention is not limited to these embodiments, and can be modified within a range that does not depart from the essence of the invention.

For example, in the first and second embodiments, the connection between the refrigerant line connection portions and the connection line connection portions and each refrigerant line and connection line is a flare nut connection, but may instead be connected by means of brazing.

INDUSTRIAL APPLICABILITY

By using the present invention, the work efficiency of the installation of the indoor unit and the outdoor unit can be improved, because the electric insulation unit is a separate unit from the indoor unit and the outdoor unit.

What is claimed is:

1. An electric insulation device of an air conditioner divided into an indoor unit and an outdoor unit, the electric insulation device serving to electrically insulate connection lines that connect refrigerant lines of the indoor unit with refrigerant lines of the outdoor unit and circulate refrigerant, from the refrigerant lines of the indoor unit or the refrigerant lines of the outdoor unit, the electric insulation device comprising:

a refrigerant line connection portion that is installed on an exterior of the indoor unit and the outdoor unit, and connected respectively to the refrigerant line of the indoor unit and the refrigerant line of the outdoor unit;

a connection line connection portion that is connected to the connection line; and an insulation portion that can both electrically insulate the refrigerant line connection portion and the connection line connection portion, and circulate refrigerant.

2. The electric insulation device of an air conditioner disclosed in claim 1, wherein a terminal portion on which an electric connection line is mounted in order to transmit electric signals from the indoor unit and the outdoor unit to the connection lines is arranged between the connection line connection portion and the insulation portion.

3. An air conditioner, comprising:

an indoor unit;

an outdoor unit;

connection lines that connect refrigerant lines of the indoor unit and refrigerant lines of the outdoor unit, and circulate refrigerant; and electric insulation devices disclosed in claim 1 that are respectively arranged between the refrigerant lines and the connection lines of the indoor unit, and between the refrigerant lines and the connection lines of the outdoor unit.

4. An air conditioner, comprising:

an indoor unit;

an outdoor unit;

connection lines that connect refrigerant lines of the indoor unit and refrigerant lines of the outdoor unit, and circulate refrigerant; and electric insulation devices disclosed in claim 2 that are respectively arranged between the refrigerant lines and the connection lines of the indoor unit, and between the refrigerant lines and the connection lines of the outdoor unit.

* * * * *